United States Patent [19]

Buning et al.

[11] 4,219,591
[45] Aug. 26, 1980

[54] PROCESS FOR COATING AN INORGANIC SILICATIC SUBSTRATE

[75] Inventors: Robert Buning, Troisdorf-Sieglar; Gerhard Bier, Troisdorf, both of Fed. Rep. of Germany

[73] Assignee: Dynamit Nobel Aktiengesellschaft, Troisdorf, Fed. Rep. of Germany

[21] Appl. No.: 897,898

[22] Filed: Apr. 18, 1978

Related U.S. Application Data

[63] Continuation of Ser. No. 695,222, Jun. 11, 1976, Pat. No. 4,097,436, which is a continuation of Ser. No. 558,505, Mar. 14, 1975, abandoned.

[30] Foreign Application Priority Data

Mar. 14, 1977 [DE] Fed. Rep. of Germany ....... 2412292

[51] Int. Cl.$^2$ ............................................. B05D 1/00
[52] U.S. Cl. ..................................... 427/387; 525/60
[58] Field of Search ....................... 526/8, 7; 427/387; 525/60

[56] References Cited

U.S. PATENT DOCUMENTS

| | | | |
|---|---|---|---|
| 3,220,991 | 11/1965 | Martins | 260/91.3 |
| 3,470,125 | 9/1969 | Sliwka et al. | 260/29.6 |
| 3,629,214 | 12/1971 | Buning et al. | 260/85.5 |
| 3,729,438 | 4/1973 | Plesich et al. | 260/29.6 R |
| 3,736,311 | 5/1973 | Subramanian | 260/91.3 PV |

*Primary Examiner*—Stanford M. Levin
*Attorney, Agent, or Firm*—Sprung, Felfe, Horn, Lynch & Kramer

[57] ABSTRACT

A process for coating an inorganic silicatic substrate is described wherein the substrate is contacted with a copolymer of vinylacetate and a vinylalkoxysilane followed by water removal.

4 Claims, No Drawings

PROCESS FOR COATING AN INORGANIC SILICATIC SUBSTRATE

This is a continuation, of application Ser. No. 695,222, filed June 11, 1976, U.S. Pat. No. 4,097,436, June 27, 1978 which is, in turn, a continuation of application Ser. No. 558,505, filed Mar. 14, 1975, now abandoned.

BACKGROUND OF THE INVENTION

1. Field of the Invention

This invention relates to a saponified copolymer of vinylacetate and a vinylalkoxysilane wherein the alkoxy groups of the silane are completely saponified and the acetyl groups of the vinylacetate are at least partially saponified. More especially, this invention relates to non-cross-linked copolymers of vinylacetate and vinylalkoxysilane and the use of aqueous solutions thereof in the treatment of inorganic silicatic substrates.

2. Discussion of the Prior Art

The polymerization of vinylacetate with other materials is well known. It is also known to form copolymers thereof with vinylalkoxysilanes. These copolymers can be formed for instance in solution by solution polymerization in the presence of an initiator. Azoisobutyronitrile, for example, can be used although other radically acting initiators can be employed.

It has become desirable, however, to prepare non-cross-linked copolymers of vinylacetate and vinylalkoxysilanes additionally characterized by the fact that the alkoxy groups of the vinylalkoxysilanes are saponified and the acetyl group of the vinylacetate units are at least partially saponified. It has become particularly desirable to prepare aqueous solutions of these materials wherein the alkyl group of the alkoxy silane is replaced by an alkali metal, ammonium or hydrogen. It has become additionally desirable to provide aqueous solutions to such saponified non-cross-linked copolymers of vinylacetate and vinylalkoxysilane.

SUMMARY OF THE INVENTION

In accordance with this invention there is provided a copolymer of vinylacetate and a vinylalkoxysilane wherein the alkoxy groups of said vinylakoxysilane are in a saponified form and the acetyl groups of said vinylacetate are at least partially saponified, the vinylsilane radicals of said formula

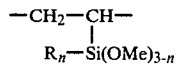

wherein
R is hydrogen, aryl, cycloalkyl or a branched or unbranched saturated alkyl of 1 to 18 carbon atoms;
Me is an alkali metal, ammonium or hydrogen,
n is 0 to 2.

In accordance with this invention there are provided new copolymers which can have a wide variety of molecular weight. The copolymers of the present invention can have a low molecular or high molecular weight or a molecular weight intermediate thereof. Preferably, the copolymers of the present invention have molecular weights between 5,000 and 150,000.

The novel copolymers of the present invention can additionally contain units of a monoethylenically unsaturated monomer which copolymerizes with vinylacetate. The copolymers are provided by polymerizing vinylacetate and vinylalkoxysilane in the known manner with the additional use, if desired, of a monoethylenically unsaturated monomer copolymerizable with vinylacetate. After the initial copolymer is performed it is subjected, in accordance with this invention, to a saponification or transesterification which is carried out by contacting the copolymer in solution with an alcoholic solution of an alkali metal hydroxide. This treatment effects precipitation of a copolymer which is thereafter contacted with an aqueous alkali lye or aqueous ammonia solution thereby providing the desired saponified vinylacetatevinylalkoxysilane copolymer. The resultant copolymer is in a form characterized by an exceptionally low degree of cross-linking. Generally, the cross-linking content is no greater than about 5%.

Mostly, the saponification or transesterification is followed by a washing and refinement of the copolymer before the material is subjected to treatment with the aqueous alkali lye or ammonia solution. If desired, and in one preferred mode of this invention, the aqueous solution of the copolymer formed upon treatment of the precipitated copolymer with the aqueous alkali lye or ammonia solution is treated with an acid unitl the pH of the solution drops to 7 or below, preferably between 1 and 4. By such acidification the alkali metal atoms which replaced the alkyl group of the alkoxy radical are themselves replaced by hydrogen as more fully described below.

DESCRIPTION OF SPECIFIC EMBODIMENTS

In order to prepare the copolymers of the present invention the copolymer of the vinylalkoxysilane and vinylacetate must be initially formed. The vinylalkoxysilane utilized has the general formula

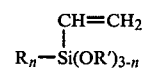

in which R represents hydrogen, an aryl especially phenyl, cycloalkyl, e.g., $C_5$–$C_7$ cycloalkyl or arylalkyl or a branched or unbranched saturated alkyl radical of 1 to 18 carbon atoms, preferably 1 to 4 carbon atoms or Cl, R' represents identical or different saturated, branched or unbranched alkyl radicals of 1 to 18 carbon atoms. The alkyl radicals of R' can be ones wherein the chain of carbon atoms is interrupted by an oxygen atom such as a radical—$CH_2$—$CH_2$—O—$CH_2$—$CH_3$. In the formula n is 0 to 2.

Examples of vinylalkoxysilanes are: vinyltrialkoxysilanes such as vinyltrimethoxysilane, vinyltriethoxysilane, vinyl-tris-($\beta$-methoxyethoxy)-silane and the like, and vinyldialkoxysilanes such as vinylisobutyldimethoxysilane, vinylmonochlorodimethoxysilane and the like. Vinyltrialkoxysilanes having $C_1$ to $C_4$ alkyl radicals are preferred.

The vinylalkoxysilane is best used in a quantity amounting to 0.1 to 20, preferably 0.5 to 15, percent of the total weight of the monomers to be polymerized.

Examples of additional comonomers which can be used owing to their ability to copolymerize with vinylacetate are: ethylene, propylene, acrylic esters and the like. It is desired to use the monomer in lesser amounts than the vinylacetate. For example, the vinylacetate content of the polymer can be replaced by approximately 30 to 40% by weight of comonomer.

The copolymers obtained from copolymerization of vinylacetate and vinylalkoxysilane are those prepared in the known manner, preferably by solution polymerization in the presence of an initiator. Azoisobutyronitrile or another radically acting initiator can be employed for this purpose. The polymerization is best performed with the substantial exclusion of moisture and oxygen. The reactants as well as the solvents should be dry and pure insofar as possible. An appropriate solvent for this polymerization, for instance, is ethyl acetate. After several hours of reaction at elevated temperatures, e.g., at temperatures between 40° C. and the boiling temperature of the solvent, in an apparatus equipped with reflux condenser, the solvent is removed, for example, by use of a rotary evaporator and a copolymer is obtained which is the starting product for the preparation of the new copolymers of the present invention.

The relative viscosities of these unsaponified copolymers which are utilized as starting materials of the present invention depend upon the molecular weight, polymerization, temperature and also upon the percentage of vinylalkoxysilane in the copolymer. If, for example, the monomeric component of the polymerization mixture comprises 0.5 weight percent of vinyltriethoxysilane and 99.5 weight percent vinylacetate, a copolymer is obtained having a relative viscosity ($\eta_{rel}$) of 1.310 (determined in a 1 weight percent solution in ethyl acetate at 20° C.) at a polymerization temperature of 75° C. If, however, the monomeric composition of the polymerization reaction mixture consists of 15 weight percent vinyltriethoxysilane and 85 weight percent vinylacetate a copolymer is obtained having a relative viscosity of 1.110 at the same polymerization temperature. Generally speaking, the copolymers which serve as starting materials of the present invention have a relative viscosity of between 1.05 and 6.0.

In the saponification or transesterification procedure of the invention a 10 to 50%, by weight alcoholic solution of copolymer is reacted, with stirring, with between 0.2 and 2 weight percent of alkali hydroxide. The reaction is desirably accomplished at elevated temperature such as at a temperature between 30° C. and the boiling point of the reaction mixture. Usually the saponified copolymers precipitate out of the hot solution. They are thereafter separated from the liquid, washed with alcohol, for example, and, if desired, dried.

Alcohols which are useful solvents for the alkali metal hydroxides include methanol, ethanol, normal propanol, isopropanol, normal butanol and isobutanol. It should be understood that the concentration of the copolymer in its solution can be greater than 50% or lower than 10% and that the range of 10 to 50 weight percent represents a preferred range.

The new modified copolymers of the invention are obtained if the saponified or transesterified copolymer is contacted thereafter with an aqueous alkali metal hydroxide or aqueous ammonia solution. The aqueous alkali metal hydroxides can be diluted alkali metal hydroxide such as 0.5 to 5 weight percent solutions. The alkali metal hydroxides particularly suitable include sodium hydroxide and potassium hydroxide. Aqueous ammonia solutions can also be used. When an aqueous ammonia solution is used, a concentration of 15 to 25 percent by weight is desired. The new copolymers of the invention can, if desired, be treated with an acid to remove any alkali metal or ammonia with hydrogen. If an acid treatment is performed the acid is usually one of the following: HCl, $H_2SO_4$, $HNO_3$, $H_3PO_4$, $CH_3COOH$ and the like.

The copolymers of the present invention can be formed in a water soluble or insoluble form depending upon the silane content. The copolymers tend to become more water insoluble as the specific silane content increases. This insolubility has been found to depend upon the amount of alkali metal hydroxide that remains in the saponified copolymer and thus the extent to which the copolymer is washed following the treatment with the alcoholic solution is relevant. The waterinsoluble copolymers can be dissolved by aqueous alkali metal hydroxides or aqueous ammonia solutions, the solubility being promoted by increasing concentrations of alkali and ammonia in the aqueous solutions used. Moderately elevated temperatures also promote water solubility.

In order to understand and fully appreciate the chemical phenomenon which is occurring by the subject process reference is made to the theoretical chemical formulas set forth below.

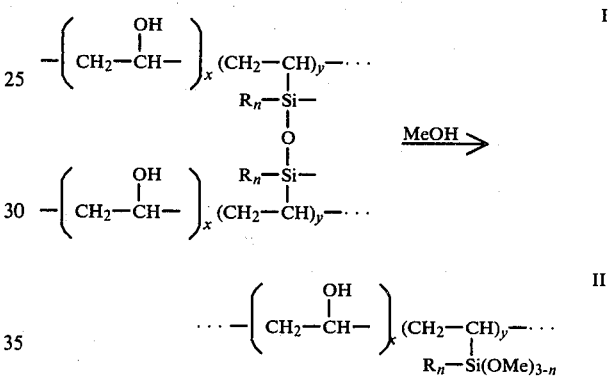

In the above formula Me represents an alkali metal or ammonium, x and y which may be equal or unequal to one another, each independently represent a whole number of 1 or more and up to 2,000. Preferably, x and y are whole numbers between 1 and 1,000. In the formulas, n is 0 to 2 while R has the same meaning as set forth in the abstract.

If the aqueous solutions of the non-cross-linked polymer of formula II are acidified with dilute aqueous hydrochloric acid, for example, the reverse reaction to the product of formula I surprisingly does not take place as would be expected. It has been discovered that when the aqueous solution of the product of formula II is acidified the viscosity does not increase nor does any precipitation of the product of formula I occur. This means that no-cross-linking takes place when the materials are in solution. Stated differently, no cross-linking takes place at certain polymer concentration levels. In the acid solution, the copolymer of formula II is transformed to the copolymer of the following structure.

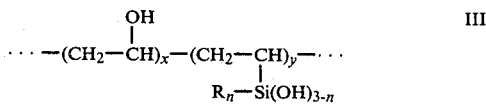

If films are cast from aqueous acid solutions containing the copolymer of formula III and dried, a clear film is obtained which is insoluble in water. Solubility in water in this case is dependent on the pH of the casting solution. If the pH of the casting solution is 1 to 3 the dried film will be insoluble in water; at pH 4 to 6 it will be partially soluble in water, and at pH 7 it will be completely water soluble. Aqueous solutions of copolymers of formula III are stable at pH 1.0, i.e., no precipitation takes place at certain solid concentrations. In general, aqueous solutions of formula III are stable at pH 1 to 6 provided the concentrations of solids are less than 6% by weight.

The stability of the solutions depends also on the molecular weight of the copolymer and on its silane content in addition to the concentration of solids. For example, an aqueous solution containing a copolymer of Formula III in a concentration of 5% by weight is stable for several weeks and longer at pH 1. A 6 weight percent solution of the same copolymer, however, will set in a short time at pH 1. The copolymer had been prepared by the saponification of a copolymer of 96 weight-parts of vinylacetate and 4 weight parts of vinyltriethoxysilane. It had a relative viscosity of 1.22, measured in a 1 weight percent solution in ethyl acetate at 20° C.

The units given in formulas I and II are to be interpreted as monomer units in the polymer. The polymers can, as described above, contain other monomer units in addition thereto. They can also have branches and can contain acetyl groups. The acetyl group content amounts generally to about 2 to 30 % by weight.

The new copolymers are used for the coating of inorganic silicatic substrates. In the cross-linked state in accordance with formula I they exhibit strong adhesion to sheet glass, for example, when they are applied in the form of an aqueous, acidic solution in accordance with formula III. After the evaporation of the water, a polymer film forms pursuant to formula I. Other examples of inorganic silicatic substrates are glass filaments, glass wool, glass fabrics, and inorganic silicatic building materials. They are also suitable as thickening agents, as for example in paints for the protection of structures. For example, aqueous solutions of formula II in concentrations exceeding 6 weight percent, for example, 10 to 20 weight percent can be prepared without being excessively viscous. The addition of acids changes the viscosity markedly, so that a gel is obtained.

If aqueous ammonia solution is used instead of alkali lyes for the purpose of transforming the saponified copolymers to polymers of Type II, solutions of the copolymer are then obtained which are much more viscous than solutions prepared with alkali metal hydroxides.

The new copolymers can also be used, for example, as suspension vehicles in polymerization reactions. For example, substances which are to be kept in finely divided form can be dispersed in aqueous solutions of copolymers of the formula II type and afterward, by the acidification of the solution, can be kept in finely divided form, even without continued stirring, since the viscosity is greatly increased upon acidification provided certain concentrations are present, depending on the molecular weight.

The required amount of alkali hydroxide or ammonium hydroxide, as the case may be, depends on the silane content. For example, a saponification product of a copolymer of 95 weight percent vinylacetate and 5 weight percent vinyltriethoxysilane requires at least 0.75 weight percent of NaOH with respect to 100 parts of copolymer by weight. The saponification product of a copolymer of 85 weight percent vinylacetate and 15 weight percent vinyltriethoxysilane requires at least 10 weight percent of NaOH with respect to 100 parts of copolymer by weight. Although the critical figures regarding solid content, the required amount of alkali or ammonia etc, cannot be given for all cases, they are easy to determine by experiment in the individual case.

In order to more fully illustrate the nature of the invention and the manner of practicing it the following examples are presented:

EXAMPLES

A. Preparation of copolymers of vinylacetate and vinyltriethoxysilane 720 g of distilled vinylacetate, 30 g of vinyltriethoxysilane and 750 g of acetic acid ethyl ester were placed under nitrogen in a 3-liter three-necked flask equipped with stirrer, thermometer, reflux condenser and nitrogen supply tube and exhaust tube. The mixture was heated with a water bath, with stirring, to 75° C. Then 0.750 g of azoisobutyric acid dinitrile (commercially obtainable under the name "Porofor N") were added to the mixture. Another 0.750 g of azoisobutyric acid dinitrile was added after two hours of heating at 75° C., and another after three more hours of heating at 75° C. After a total reaction time of 7.5 hours, 375 g of acetic acid ethyl ester was added drop by drop to the batch over a period of one-half hour. This made the viscosity of the solution such that it could be handled easily. The acetic ester was removed in a rotatory evaporator and 745 g of a glass-clear polymer was obtained whose relative viscosity, measured in a 1 weight percent solution in acetic ester at 20° C., amounted to 1.220.

The relative viscosities reported herein were measured in the Hoppler viscosimeter and calculated by the following formula:

$$n_{rel} = \frac{t \text{ (solution)}}{t \text{ (solvent)}}$$

t being the pouring time, using a 1 weight percent solution of polymer in acetic acid ethyl ester at 20° C.

On the basis of the above formula (composition from Example 5) additional copolymers were prepared from vinyl acetate and vinyl triethoxysilane, except that the percentage content of the vinyl triethoxysilane in the monomeric component was varied.

As Table 1 shows, the relative viscosities depend on the weight-percentage of the momomeric vinyl triethoxysilane in the monomeric component, at constant polymerization temperature.

Table 1

| Examples | Wt.-percentage of vinyltriethoxysilane in the polymerization mixture | $\eta_{rel}$ |
| --- | --- | --- |
| 1 | 0.5 | 1.310 |
| 2 | 1.0 | 1.301 |
| 3 | 2.0 | 1.247 |
| 4 | 3.0 | 1.235 |
| 5 | 4.0 | 1.220 |
| 6 | 5.0 | 1.200 |
| 7 | 10.0 | 1.150 |
| 8 | 15.0 | 1.110 |

If a monomeric component composed of 0.5 wt.-% vinyl triethoxysilane and 99.5 wt.-% vinyl acetate is used (Example 1), the relative viscosity amounts to 1.310. As the amount of vinyl triethoxysilane increases, the relative viscosity diminishes down to 1.110 (Example 8).

The copolymers dissolved in acetic ester can be cross-linked by the addition of 0.5 wt.-% hypophosphoric acid with respect to the copolymer, which shows that they are true copolymers. As it can be seen from Table 2, the cross-linked percentage increases with the percentage of the vinyl triethoxysilane in the monomeric component.

Table 2

| Example | Wt.-% silane | Cross-linked percentage by weight |
|---|---|---|
| 1 | 0.5 | 75.0 |
| 2 | 1.0 | 83.2 |
| 3 | 2.0 | 92.8 |
| 4 | 3.0 | 95.0 |
| 5 | 4.0 | 98.8 |

B. Preparation of the polymers of the invention.

Saponification of the polymers described under A: 50 ccm of 1 wt.-% methanolic NaOH was placed in a 500 ccm three-necked flask equipped with stirrer, reflux condenser and dropping funnel. The contents of the flask were heated with stirring to 50° C. Over a period of 30 minutes, 15 g of a copolymer of vinyl acetate and vinyltriethoxysilane from Examples A-1 to A-8 was let in through the dropping funnel. Then the mixture was stirred for 30 additional minutes at 50° C. The saponified product that precipitated was washed with methanol and dried.

The saponified specimens were insoluble in water to a degree relating to their residual alkali content. However, they were soluble in dilute aqueous soda lye at 50° C. and they remained soluble even after cooling down to 20° C. The required amount of NaOH depends upon the silane content of the monomeric component that was used in the preparation of the copolymers in accordance with Examples A-1 to A-8. For example, a saponification product of a copolymer of 95 wt.-parts of vinyl acetate and 5 wt.-parts of vinyl triethoxysilane requires at least 0.75 wt.-% of NaOH. The saponification product of a copolymer of 85 wt.-% vinyl acetate and 15 wt.-% vinyl triethoxysilane required at least 10 wt.-% of NaOH, each with respect to the saponified copolymer.

In Table 3 are given the relative viscosities of the saponified copolymers dissolved in alkali lyes, as measured on solutions of 1 % by weight in water at 20° C., with respect to the starting copolymers.

Table 3

| Example | Weight-% Silane | $\eta_{rel}$ |
|---|---|---|
| 1 | 0.5 | 1.575 |
| 2 | 1.0 | 1.480 |
| 3 | 2.0 | 1.310 |
| 4 | 3.0 | 1.230 |
| 5 | 4.0 | 1.200 |
| 6 | 5.0 | 1.195 |
| 7 | 10.0 | 1.135 |
| 8 | 15.0 | 1.105 |

If the relative viscosities of the saponified and unsaponified specimens are compared (Tables 3 and 1), the viscosities of the saponified and unsaponified copolymers are of the same order of magnitude. The saponification of copolymers of vinyl acetate and vinyl triethoxysilane is thus a reaction analogous to polymerization.

If sheets are cast from the product from Example B-5, Table 3, with varying pH, specimens are obtained which have varying solubility in water. Table 4 shows the solubilities.

The aqueous casting solutions contained 5 wt.-% of the copolymer of Example B-5, Table 3. If the pH is varied from 7.0 to 1, no substantial change in the viscosity occurs. This shows that the polymer of Formula II becomes a polymer of Formula III, and that siloxane bonds in accordance with Formula I occur only to a slight extent or not at all.

Table 4

| pH | Solubility in wt.-% in H$_2$O |
|---|---|
| 1.0 | 0 |
| 2.0 | 0 |
| 3.0 | 0 |
| 4.0 | 6 |
| 5.0 | 20 |
| 6.0 | 90 |
| 7.0 | 100 |

What is claimed is:

1. A process for coating an inorganic silicatic substrate which comprises contacting said substrate with an aqueous acidic solution of a copolymer which forms a water insoluble film which copolymer is a copolymer of vinyl acetate and a vinyl alkoxysilane, wherein the alkoxy groups of said vinyl alkoxysilane are in a completely saponified form and the acetyl groups of said vinyl acetate are at least partially saponified, said polymer having repeating units of the formula

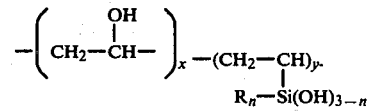

wherein
R is hydrogen, aryl, cycloalkyl or branched or unbranched saturated alkyl of 1 to 18 carbon atoms;
n is 0 to 2;
x is a whole number more than 1 to 2,000;
y is a whole number more than 1 to 2,000 and thereafter removing water therefrom.

2. A process according to claim 1 wherein said copolymer has a molecular weight of 5,000 to 150,000.

3. A process according to claim 1 wherein the unsaponified form of said copolymer has a relative viscosity (determined in a 1 weight percent solution in ethyl acetate at 20° C.) of between 1.05 and 6.0.

4. A process according to claim 1 wherein said copolymer has a relative viscosity of 1.105 to 1.575.

* * * * *

UNITED STATES PATENT AND TRADEMARK OFFICE
CERTIFICATE OF CORRECTION

PATENT NO. : 4,219,591
DATED : August 26, 1980
INVENTOR(S) : ROBERT BÜNING and GERHARD BIER It is certified that error appears in the above—identified patent and that said Letters Patent is hereby corrected as shown below:

| Column | Line | |
|---|---|---|
| 1 | 31 | insert --completely-- before "saponified". |
| 1 | 37 | "to" (second occurrence) should be --off--. |
| 1 | 45 | "vinylakoxysilane" should be --vinylalkoxysilane-- |
| 4 | 11 | after "water" insert -- - --. |
| 6 | 34 | "Hoppler" should be --Höppler--. |

On the cover page next to "Inventors:" "Robert Buning" should be --Robert Büning--

Under "Foreign Application Priority Data" "March 14, 1977" should be --March 14, 1974--

Signed and Sealed this

Twentieth Day of January 1981

[SEAL]

Attest:

RENE D. TEGTMEYER

Attesting Officer

Acting Commissioner of Patents and Trademarks